United States Patent [19]

Amano

[11] Patent Number: 5,117,682

[45] Date of Patent: Jun. 2, 1992

[54] IDLING DETECTION DEVICE

[75] Inventor: Mitsuo Amano, Shizuoka, Japan

[73] Assignee: Jatco Corporation, Japan

[21] Appl. No.: 659,099

[22] Filed: Feb. 22, 1991

[30] Foreign Application Priority Data

Mar. 1, 1990 [JP] Japan ................................ 2-50058

[51] Int. Cl.⁵ .......................................... G01M 19/00
[52] U.S. Cl. .................................................. 73/118.1
[58] Field of Search ............... 73/116, 118.1; 74/854, 74/865

[56] References Cited

U.S. PATENT DOCUMENTS

| | | | |
|---|---|---|---|
| 4,359,894 | 11/1982 | Ikeura et al. | 73/118.2 |
| 4,411,154 | 10/1983 | Kitamura et al. | 73/118.1 |
| 4,417,468 | 11/1983 | Yasuda et al. | 73/118.1 |
| 4,581,924 | 4/1986 | Otobe et al. | 73/118.1 |
| 4,930,079 | 5/1990 | Kondo | 73/118.1 X |
| 4,951,206 | 8/1990 | Kyohzuka | 73/118.1 X |

FOREIGN PATENT DOCUMENTS 62-62047  3/1987  Japan.
63-25165  2/1988  Japan.

Primary Examiner—Jerry W. Myracle

[57] ABSTRACT

In order to obviate rapid on/off hunting of an engine idle detection circuit which is operatively connected with a throttle valve position sensor, the detection circuit outputs an idle indication when the throttle valve opening is indicated as having fallen below a first predetermined level which is proximate the fully closed one. The idle indication is maintained until such time as the throttle valve is indicated as having opened beyond a second predetermined level which is slightly greater than the first one.

4 Claims, 3 Drawing Sheets

IDLING DETECTION DEVICE

BACKGROUND OF THE INVENTION

1. Field of the Invention

The present invention relates generally to a device for detecting an automotive internal combustion engine having entered a idling mode of operation and more specifically to a idling detecting device which can be used in connection with the control of an automatic transmission lock-up clutch by way of example.

2. Description of the Prior Art

JP-A-62-62047 and JP-A-63-25165 disclose idling detection arrangements. In these types of idling detection devices, a switch is provided which is triggered when the engine assumes an idling mode of operation. This type of idling detection switch exhibits an ON/-OFF type of operation and is triggered to switch from one state to another in response to the throttle valve assuming a fully closed position. When the switch is triggered by the throttle valve assuming a fully closed position, the lock-up clutch is controlled to assume a released state.

However, with this type of control. it is necessary to provide a separate throttle switch which thus increases the cost and complexity of the idle detection arrangement. That is to say, when an automatic transmission is used, it is necessary to provide the engine throttle valve with an additional switch which detects the same as assuming a fully closed position.

Further, as this switch does not exhibit hysteresis and switches from one state to another (ON/OFF) in response to very small changes in throttle valve position, it sometimes occurs that vibration induces frequent switching between the ON and OFF states and deteriorates the lock-up clutch control to the point where the required smooth vehicle driving characteristics cannot be obtained.

SUMMARY OF THE INVENTION

It is an object of the present invention to provide an arrangement which eliminates the need for a separate switch and which exhibits hysteresis of a nature that enables the above mentioned drawbacks to be eliminated.

In brief, the above object is achieved by an arrangement wherein the detection circuit outputs an idle indication when the throttle valve opening is indicated as having fallen below a first predetermined level which is proximate the fully closed level. The idle indication is maintained until such time as the throttle valve is indicated as having opened beyond a second predetermined level which is slightly greater than the first predetermined level.

More specifically, a first aspect of the present invention is provided in an idling detection device for an internal combustion engine which features: means for producing a signal indicative of throttle position; and means responsive to the output of the position detecting means falling between a predetermined value proximate the minimum position value and the minimum position value.

A second aspect of the present invention is provided in an idling detection device for an internal combustion engine which features: means for producing a signal indicative of throttle position; and means responsive to the output of the position detecting means falling between a predetermined range proximate the minimum position value and the minimum position value, the predetermined range having upper and lower limits, the indication that the engine has entered an idling mode being based on the lower limit and the change from an idling mode being based on the upper limit.

A further aspect of the present invention is provided in an arrangement which features: an engine having a throttle valve; a throttle valve position sensor operatively connected with the throttle valve and arranged to output a signal indicative of the position of the throttle valve, the output of the throttle valve sensor having a minimum value indicative of the throttle valve being in a fully closed position; idling detection means operatively connected with the throttle valve position sensor and responsive to the output thereof, the idling detection means determining that the engine is idling when the output of the throttle valve position sensor falls below a first predetermined value, the idling detection means maintaining the idling determination until such time as the output of the throttle valve position sensor increases above a second predetermined value which is greater than the first predetermined value.

DETAILED DESCRIPTION OF THE PREFERRED EMBODIMENTS

Figure 1:
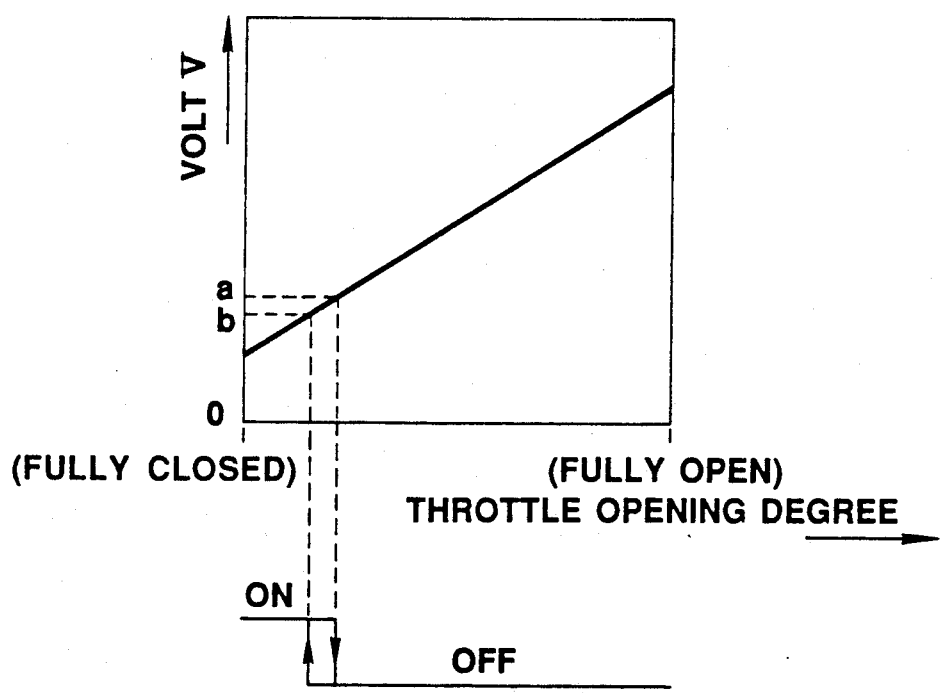
FIG. 1 is a graph which demonstrates the characteristics which characterize the operation of the present invention.
Figure 3:
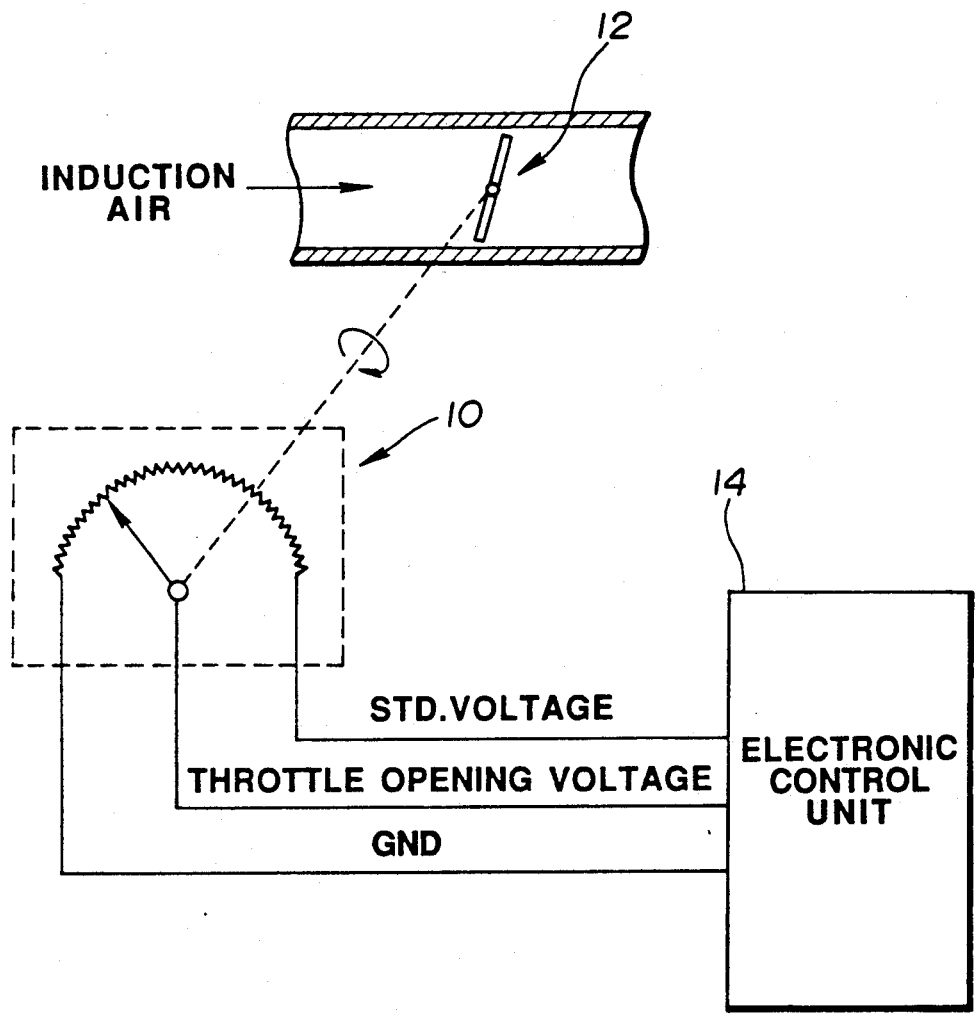
FIG. 3 is a schematic drawing depicting the arrangement of the present invention.

FIG. 3 shows a throttle sensor 10 which is operatively connected with an engine throttle valve 12 and arranged to output a signal indicative of the throttle valve opening degree to an electronic control unit 14. In this embodiment, the electronic control circuit 14 is arranged to compare the levels of a standard voltage with that indicative of the throttle position. In this manner, the operational characteristics shown in FIG. 1 are obtained. That is to say, the voltage ratio increases linearly from a fully closed position to a fully open one. In this instance, the output of the throttle sensor 10 is supplied to a microprocessor which is included in the electronic control unit 14 and which is arranged to control transmission shifting, line pressure level control, etc. Of course the control unit 14 is arranged to receive a number of different data inputs; however, as these are not directly related to the present invention, they have been omitted for drawing simplicity.

Figure 2:
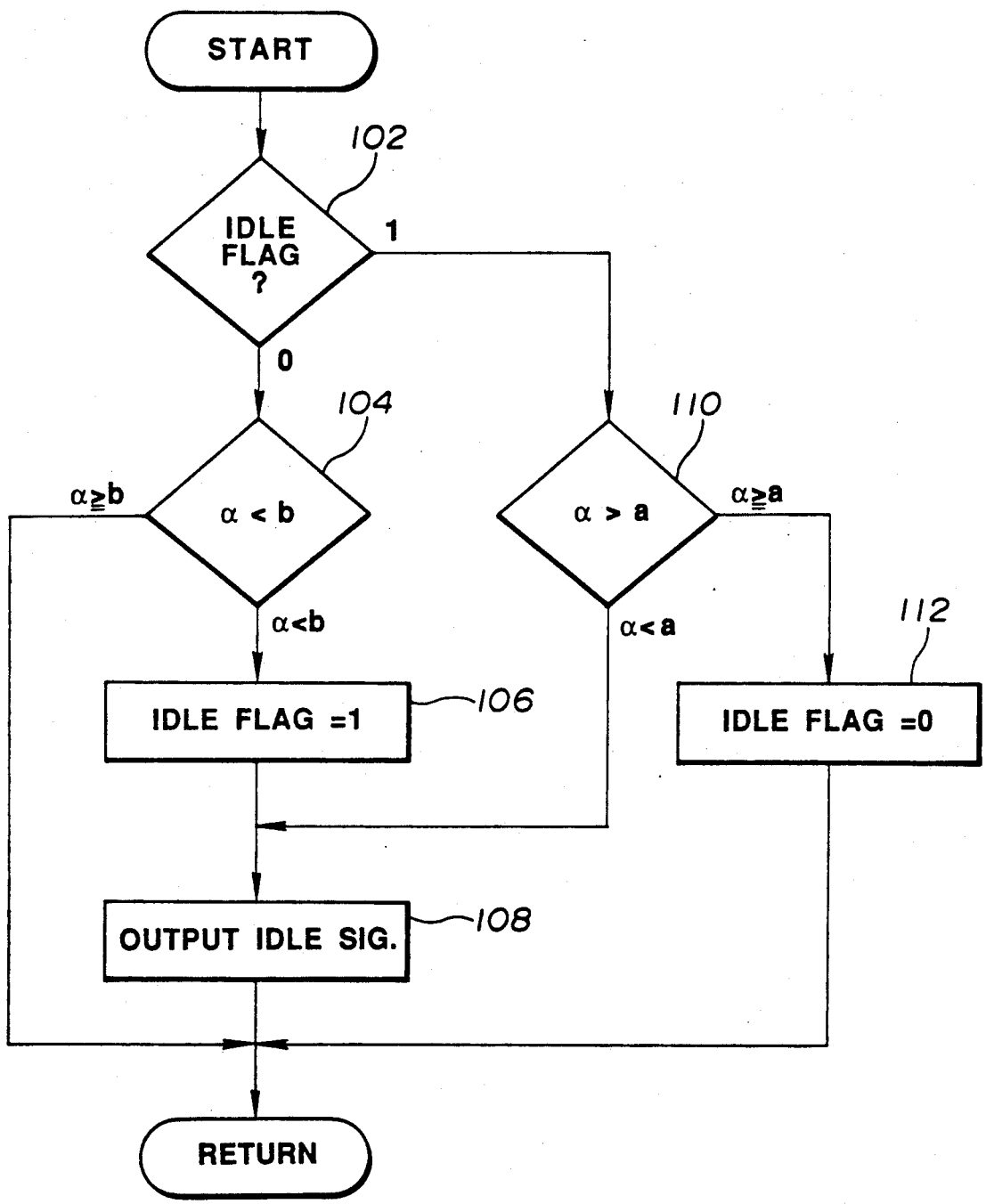
FIG. 2 is a flow chart showing the steps which characterize the operation performed by a control program which is used in conjunction with the present invention.

In connection with idling detection, the microprocessor is arranged to run a program of the nature depicted in FIG. 2 in order to determine if the engine has entered an idling mode of operation and to endow the system with hysteresis characteristics. In the first step 102 of this routine, the status of a idle flag is checked. In the event that it is found that the flag is not set (=0), the routine goes to step 104 wherein the output of the throttle sensor is compared with the lower (b) of two predetermined values a and b. Note that, as shown in FIG. 1, the voltage level indicated by b is lower than that indicated by a. In the event that ≧b, the routine returns. That is to say, it is determined that the throttle valve opening is above that indicated by the lower of the two predetermined values and that the engine is not idling. On the other hand, if <b, then it is deemed that the engine has entered a idling mode and the routine goes to step 106 wherein the idle flag is set=1. Following this, at step 108 an idle indicative signal is generated.

However, in the event that it is found that the idle flag has been set in step 102, then the routine goes to step 110 wherein the output of the throttle sensor 10 is compared with the predetermined value a. In the case that ≧a, it is indicated that the throttle valve 12 has opened sufficiently that the engine should no longer be indicated as idling. Accordingly, the routine goes to step 112 wherein the idle flag is cleared.

On the other hand, if the outcome of step 110 is such as to indicate that <a, then it is deemed that the throttle valve has closed beyond the level indicated by b but as yet, has not reopened beyond the level indicated by a. In response to this outcome, the routine flows to step 108 wherein the indication that the engine is idling is maintained.

As will be appreciated, with the above type of control, it is possible to endow hysteresis on the system and induce the situation wherein idling is not indicated until such time as the throttle valve 12 closes beyond point b. The indication that the engine is idling is maintained until such time as the throttle valve 12 opens to the point indicated by a. This obviates hunting due to vibration and the like causes and thus stabilizes the idling indication by the sensor 10. The resulting lock-up clutch control and the like which are dependent on the detection of the engine operating at zero load are thus rendered more stable.

While the above throttle sensor 10 has been disclosed as including a variable resistor type arrangement, it will be understood that the invention is not necessarily limited to this type of sensor arrangement and that other types of devices such as light source/shutter type arrangements can be envisaged for use with the present invention.

What is claimed is:

1. An idling detection device for an internal combustion engine, comprising:
   means for producing a signal indicative of throttle position; and
   means responsive to the output of the position detecting means for producing a first indication when the signal falls below a first predetermined value which is greater than a minimum position value, and for producing a second indication when the signal rises above a second predetermined value which is greater than the first predetermined value.

2. An idling detection device for an internal combustion engine comprising:
   means for producing a signal indicative of throttle position; and
   means responsive to the output of the position detecting means falling between (a) a predetermined range proximate a minimum position value and (b) the minimum position value, for producing an indication that the engine has entered an idling mode of operation, said predetermined range having upper and lower limits, the indication that the engine has entered an idling mode being maintained until the output of the the position detecting means rises above the upper limit of the range.

3. In an engine:
   a throttle valve;
   a throttle valve position sensor operatively connected with said throttle valve and arranged to output a signal indicative of the position of said throttle valve;
   idling detection means operatively connected with said throttle valve position sensor and responsive to the signal output thereby, said idling detection means determining that the engine is idling when the signal output by the throttle valve position sensor falls below a first invariable value, said idling detection means maintaining the idling determination until such time as the signal output by said throttle valve position sensor increases above a second invariable value, the first invariable value being set a predetermined amount above the value indicative of a fully closed throttle position.

4. An idling detection device for an internal combustion engine comprising:
   means for producing a signal indicative of throttle position;
   means for comparing the signal with first, second and third fixed values, the first value being indicative of the throttle assuming a fully closed position, the second value being a predetermined amount higher than the first value and the third value being a predetermined amount higher than the second value, said comparing means issuing an engine idling indication when the signal falls below the second value and maintains the indication until the signal increases above the third value.

* * * * *